United States Patent
Colom et al.

(10) Patent No.: US 10,927,947 B2
(45) Date of Patent: Feb. 23, 2021

(54) GEAR SHIFT DEVICE FOR MOTOR VEHICLES

(71) Applicant: Fico Triad, S.A., Barcelona (ES)

(72) Inventors: Javier Moreno Colom, Barcelona (ES); Marc Antoni Cots, Sant Quirze del Vallès (ES)

(73) Assignee: FICO TRIAD, S.A., Barcelona (ES)

(*) Notice: Subject to any disclaimer, the term of this patent is extended or adjusted under 35 U.S.C. 154(b) by 16 days.

(21) Appl. No.: 15/725,081

(22) Filed: Oct. 4, 2017

(65) Prior Publication Data

US 2018/0094720 A1 Apr. 5, 2018

(30) Foreign Application Priority Data

Oct. 4, 2016 (EP) ..................... 16382454

(51) Int. Cl.
*F16H 59/04* (2006.01)
*F16H 61/24* (2006.01)
*F16H 59/02* (2006.01)

(52) U.S. Cl.
CPC ............. *F16H 59/04* (2013.01); *F16H 61/24* (2013.01); *F16H 2059/0269* (2013.01); *F16H 2061/245* (2013.01)

(58) Field of Classification Search
CPC .......... F16H 61/24; F16H 59/08; F16H 59/10; F16H 59/0213; F16H 59/0278;
(Continued)

(56) References Cited

U.S. PATENT DOCUMENTS 344,918 A * 7/1886 Miller ..................... F16C 11/06
403/142
2,905,492 A * 9/1959 Alexander .......... F16C 11/0647
403/130
(Continued)

FOREIGN PATENT DOCUMENTS

DE 4242455 A1 12/1993
EP 0728611 A1 * 8/1996 ............. F16H 59/04
(Continued)

OTHER PUBLICATIONS

European Search Report Issued in European Application No. 16382454.3 dated Jan. 30, 2017; 11 Pages.
(Continued)

*Primary Examiner* — Jake Cook
*Assistant Examiner* — T. Scott Fix
(74) *Attorney, Agent, or Firm* — Cantor Colburn LLP

(57) ABSTRACT

A gear shift device (100) includes a hollow, at least partially spherical retaining housing (110), a gear shift lever (120) having an at least partially spherical projection (130) received within the retaining housing (110), and means (140) for retaining the gear shift lever (120) against rotation around its longitudinal axis (125). The retaining means (140) includes at least one of grooves (150) and protrusions (160) for engaging at least one of corresponding grooves (150') and protrusions formed in the at least partially spherical projection (130) of the gear shift lever (120), said grooves (150, 150') and protrusions (160) being formed in the shape of two opposite cones.

12 Claims, 4 Drawing Sheets

(58) Field of Classification Search
CPC ........... F16H 59/0269; F16H 2061/242; F16H 2061/243; F16H 2061/247; F16C 11/06
USPC .............. 74/473.21, 473.25, 473.32, 473.34
See application file for complete search history.

(56) References Cited

U.S. PATENT DOCUMENTS

| | | | | |
|---|---|---|---|---|
| 3,251,237 A * | 5/1966 | Warmkessel | ............ | F16H 59/04 74/473.34 |
| 3,482,465 A * | 12/1969 | Lusted | ................... | B60K 20/02 74/473.34 |
| 3,539,234 A * | 11/1970 | Rapata | .................... | F16C 11/06 384/203 |
| 3,839,533 A * | 10/1974 | Laing | ..................... | F16C 11/06 264/309 |
| 3,988,558 A * | 10/1976 | Josemans | ............. | H01H 23/146 200/335 |
| 4,101,228 A * | 7/1978 | Scheerer | ................ | B60K 20/02 403/137 |
| 4,245,137 A * | 1/1981 | Hirai | .................. | G05G 9/04792 200/18 |
| 4,285,250 A * | 8/1981 | Iizuka | .................... | B60K 20/02 137/636.2 |
| 4,333,360 A * | 6/1982 | Simmons | ................ | F16H 59/04 267/150 |
| 4,457,188 A * | 7/1984 | Hauser | ................... | B60K 20/02 403/114 |
| 4,519,268 A * | 5/1985 | Oda | ...................... | F16H 59/042 248/181.1 |
| 4,519,286 A | 5/1985 | Oda | | |
| 4,662,772 A * | 5/1987 | Schultz | ................. | B60K 20/02 403/114 |
| 5,024,117 A * | 6/1991 | Yamada | .................. | F16H 59/04 403/114 |
| 5,592,856 A * | 1/1997 | Parsons | ................... | F16H 59/04 267/150 |
| 5,802,922 A * | 9/1998 | Kawai | ..................... | F16H 59/04 74/473.1 |
| 6,321,616 B1 * | 11/2001 | Hohmeier | ............... | F16H 59/04 403/90 |
| 8,726,756 B2 * | 5/2014 | Moreno Colom | .... | F16H 59/044 74/471 XY |
| 2003/0068193 A1 * | 4/2003 | El-Haw | ................. | B60G 7/005 403/56 |
| 2007/0137367 A1 * | 6/2007 | Papa | ....................... | F16H 59/04 74/473.34 |
| 2014/0345412 A1 * | 11/2014 | Wang | .................... | F16H 59/105 74/473.21 |
| 2015/0003893 A1 * | 1/2015 | Ishimori | ................. | F16C 11/06 403/11 |
| 2015/0337890 A1 * | 11/2015 | Faccioli | .............. | F16C 11/0604 403/122 |

FOREIGN PATENT DOCUMENTS

| | | | | |
|---|---|---|---|---|
| EP | 1892438 | A2 | 2/2008 | |
| GB | 785237 | A * | 10/1957 | ........... F16H 59/045 |
| JP | 2001080378 | A | 3/2001 | |
| JP | 2005125811 | A | 5/2005 | |
| JP | 2008006958 | A | 1/2008 | |

OTHER PUBLICATIONS

European Office Action Issued in European Application No. 16382454.3 dated Apr. 1, 2019; 7 Pages.

* cited by examiner

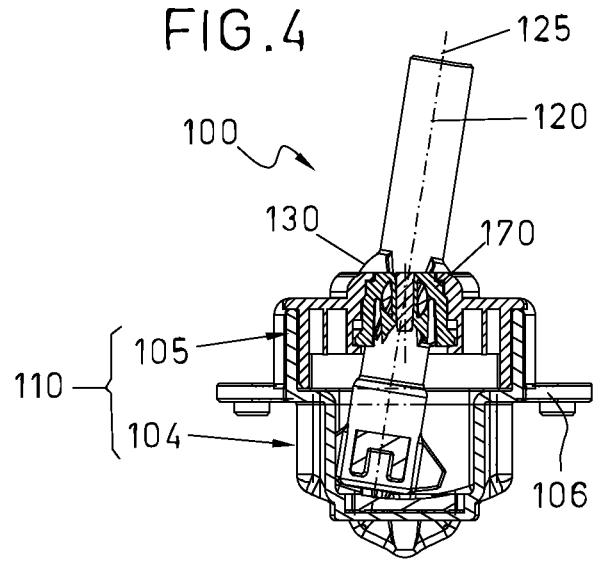
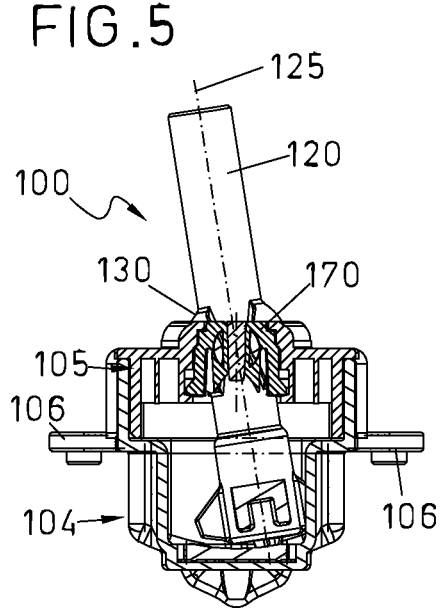
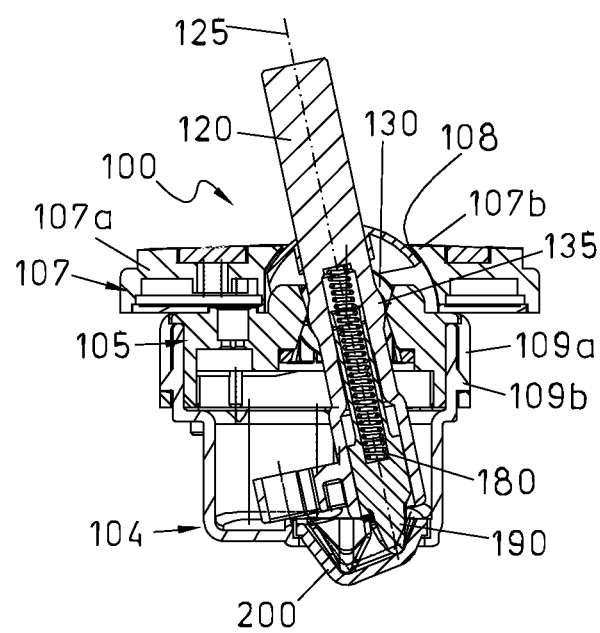

GEAR SHIFT DEVICE FOR MOTOR VEHICLES

BACKGROUND

The present disclosure relates to a gear shift device for controlling the transmission of a motor vehicle. More particularly, the present disclosure relates to a gear shift device that includes a gear shift lever pivotally mounted to a fixed part of the motor vehicle through a ball and socket joint.

Ball and socket gear shift devices for controlling vehicle transmissions are known in the art. In such devices, the gear shift lever has a spherical projection that is received inside a corresponding socket formed in a fixed part of the motor vehicle so that it can slide therein. This forms a ball and socket joint through which the gear shift lever can be actuated by a user according to a side-to-side and forward-to-backward movement for controlling the vehicle transmission, that is, for performing gear selection.

It is also known in the art to provide stop means for limiting the movement of the gear shift lever, for example around a longitudinal axis thereof.

Document DE4242455 discloses a gear shift device for motor vehicles of the above mentioned type. The gear shift lever includes a spherical projection formed therein that can be moved freely inside a socket as the gear shift lever is pivoted about a first axis for selecting a gear-shift channel and about a second pivot axis for shifting gears. The spherical projection of the gear shift lever has opposite channels for receiving corresponding protrusions formed in a fixed part of the motor vehicle that includes said socket where the spherical projection of the gear shift lever is received. The combination of channels and protrusions prevents the gear shift lever from being rotated around a vertical axis.

U.S. Pat. No. 4,519,268 also discloses a gear shift device for motor vehicles of the ball and socket type. It comprises a gear shift lever provided with a spherical projection to be received inside a socket. Protrusions are provided passing through a cylindrical side wall of the socket at opposite portions to be inserted into vertical grooves formed in the spherical projection of the gear shift lever preventing the lever from being rotated.

The main disadvantage of such known ball and socket gear shift devices is that high friction torque is involved. As the gear shift lever is pivoted, the protrusions slide on the corresponding grooves performing a sweeping motion. The surrounding parts, such as the spherical projection of the gear shift lever, should be therefore oversized in order to accommodate such sweeping motion. The fact that said surrounding parts should be designed according both to this sweeping motion and to their specific mechanical function results in undesirably bulky assemblies. A need therefore exists for improved ball and socket gear shift devices where the size that is required for the ball and socket joint is reduced while providing high rigidity and strength.

The gear shift device described below has been found to meet the above need and to provide further advantages as it will be clear hereinbelow.

SUMMARY

A gear shift device for controlling a vehicle transmission is provided herein.

The present gear shift device is of the above mentioned ball and socket type where a gear shift lever is pivotally mounted to a fixed part of a motor vehicle with means for retaining the shift lever to prevent it from being rotated in a given direction.

Specifically, the present gear shift device comprises a hollow, at least partially spherical, retaining housing, e.g. a retaining housing having an at least partially spherical interior. The retaining housing may be fixed to a motor vehicle or may be part of or be attached to a part that is fixed to a motor vehicle. Said retaining housing may be, for example, a casing or any housing-like element. A bezel may be provided above the housing. The bezel may comprise a fixed portion suitable for acting as a cover surface provided with an opening, and a movable portion that is adapted for concealing said opening.

A gear shift lever is provided to be actuated, i.e. pivoted, by a user for driving a motor vehicle transmission. The gear shift lever may be at least partially received inside the retaining housing passing through the above mentioned opening of the bezel. A longitudinal axis is defined along the length of the gear shift lever. The gear shift lever has an at least partially spherical projection, e.g. a projection having an at least partially spherical shape, for example spherical or semi-spherical. Said projection is formed at one joint section of the shift lever, that is, the location where the gear shift lever is pivoted to the retaining housing. The at least partially spherical projection may be formed integral with the gear shift lever or it may be a separate part attached to it by any suitable means. The at least partially spherical projection of the gear shift lever is configured to be at least partially received in slidable contact within the above mentioned retaining housing.

Retaining means are also provided. Such retaining means are designed for retaining the gear shift lever properly against rotation around the above mentioned longitudinal axis of the gear shift lever. The retaining means comprise at least one of grooves and protrusions formed in the retaining housing for engaging at least one of corresponding grooves and protrusions formed in the at least partially spherical projection of the gear shift lever. The protrusions may be, for example, elongated ribs projecting from at least one of the retaining housing and the at least partially spherical projection of the gear shift lever into the other of the retaining housing and the at least partially spherical projection of the gear shift lever.

The grooves formed in the at least partially spherical projection of the gear shift lever may include a curved protruding portion suitable to be contacted by a corresponding front surface or edge of the protrusions or elongated ribs as they move thereon.

In one specific example, the retaining means may comprise opposite symmetrical grooves. In this case, for example, the at least partially spherical projection of the gear shift lever may have grooves formed in two symmetric positions. Other configurations for the retaining means are also possible as long as the gear shift lever is prevented from being rotated around its longitudinal axis.

In a more specific example, the retaining means may comprise one, two or more protrusions formed projecting from the at least partially spherical projection of the gear shift lever into a wall of the retaining housing or the at least partially spherical projection of the gear shift lever. This configuration is adapted to prevent the gear shift lever from being rotated by the user around its longitudinal axis.

In the present gear shift device, the at least one of said grooves and/or the at least one of said protrusions of the retaining means are formed in the shape of two opposite cones. Specifically, at least one groove of the retaining means, which may be formed in the at least partially spherical projection of the gear shift lever and/or the retaining housing, as stated above, may be formed in the shape of two opposite cones. Additionally or alternatively, at least one protrusion, which may be formed in the at least partially spherical projection of the gear shift lever and/or the retaining housing, as stated above, may be formed in the shape of two opposite cones.

In a preferred example, a longitudinal axis is defined in said at least one of grooves and protrusions. Such longitudinal axis is arranged at least substantially parallel to the longitudinal axis of the gear shift lever.

The provision of retaining means formed in the shape of two opposite cones provide high robustness and stiffness specially when the gear shift lever is under torsional stress. The two opposite conical configuration of the retaining means provide more strength in areas with greatest stress. In addition, the parallel arrangement of the retaining means allows to provide high mechanical strength in the ball and socket joint.

In this respect, it may be preferred that the cross-section of at least some of the protrusions are shaped to correspond to the above mentioned double cone configuration of the retaining means, that is, the double cone configuration of the grooves where they are to be received.

The double cone configuration of the retaining means is thus given by the particular shape of the protrusions and according to the kinematic features of the gear shift device. It is to be noted that in the present gear shift device, the protrusions are not cylindrical but having an elongated cross-section. In particular, the cross-section of the protrusions is elongated according to an axial direction along the longitudinal axis of the gear shift lever.

The above described configuration of protrusions with elongated cross-section provides an advantage over prior art ball and socket gear shift devices with spherical projections. For the same width of one protrusion, torsion on the lever is strengthened in the present configuration. If torsional strength in prior art ball and socket gear shift devices with spherical projections would be required to be increased, the spherical projection diameter should be increased. This has the disadvantage that the size of the joint section of the shift lever is also increased and therefore that of the whole assembly and packaging thereof, which is not desired. On the other hand, when the spherical projection diameter is increased but not that of the ball and socket radius, as forces in the direction of the projections are applied, the resulting ball and socked would require larger grooves resulting in a much more inefficient assembly with the lever requiring a larger lever displacement to achieve the desired plunger displacement or a suitable displacement of the joint section of the lever with the gearbox control cable.

It may be preferred to provide a socket member. If provided, the socket member is suitably configured to have an at least partially spherical inner receiving portion, e.g. a receiving portion whose interior is at least partially spherical in shape such as for example spherical or semi-spherical. The interior of the receiving portion is configured to at least partially receive the at least partially spherical projection of the gear shift lever in slidable contact therein. A ball and socket joint is thus formed by the at least partially spherical projection of the gear shift lever and the socket member with the retaining housing.

Where a socket member is provided, the socket member is retained by the retaining housing. For this purpose, the socket member may have radially extending coupling flanges adapted to fit inside of corresponding coupling recesses formed in an inner surface of the retaining housing. According to this configuration, a quick coupling is provided by means of which the socket member is retained in the retaining housing.

In this example, at least one of said grooves and protrusions of the retaining means may be formed in the socket member, instead of or in addition to the retaining housing, to engage the grooves and protrusions formed in the at least partially spherical projection of the gear shift lever.

The socket member has inwardly projecting protrusions that are fixed to the at least partially spherical projection of the shift lever. This avoids direct contact between the protrusions of the retaining housing and the at least partially spherical projection of the shift lever. In general, the retaining means are configured such that the retaining housing and the at least partially spherical projection of the gear shift lever are not in direct contact in use.

Strength of the assembly is provided by the housing so it is made from a resistant material. Advantageously, lower quantity of material is required as compared with other parts.

The design of the socket member also allows axial attachment of the gear shift lever, that is, along its longitudinal axis, relative to the retaining housing. Specifically, the socket member is configured to retain the gear shift lever mainly in a direction along its longitudinal axis.

On the other hand, the present gear shift device allows friction torque involved and thus wear of the joint section of the ball and socket to be advantageously reduced.

The double cone geometry of the retaining means may be thus applied to the grooves formed in at least one of the retaining housing, the at least partially spherical projection of the shift lever and the socket member. However, such double conical geometry of the retaining means might be of course applied, additionally or alternatively, to the protrusions formed in at least one of the retaining housing, the at least partially spherical projection of the shift lever and the socket member.

With this configuration, the gear shift lever is allowed to be pivoted relative to the retaining housing or the socket member but it is not allowed to be rotated around the longitudinal axis of the gear shift lever.

It may be convenient to provide a spring. The spring may be arranged in the gear shift lever to urge a lower portion or plunger against a feeling surface to provide a gear shift feeling to the user as the gear shift lever is actuated.

The object of reducing the volume necessary for the ball and socket joint is thus advantageously met by the above described gear shift device. With the present ball and socket gear shift device, the at least partially spherical projection of the shift lever is very reduced in size. A very compact gear shift device is obtained while robustness, rigidity and strength of the assembly are advantageously increased.

In addition, as a result of the above described configuration for the retaining means, the joint section of the gear shift lever can be located very close to the bezel. As a result, a shorter displacement has to be traveled by the gear shift lever and therefore the opening of the bezel may be smaller in size as compared with known ball and socket gear shift devices.

Additional objects, advantages and features of examples of the present gear shift device will become apparent to those skilled in the art upon examination of the description, or may be learned by practice thereof.

BRIEF DESCRIPTION OF THE DRAWINGS

A particular embodiment of the present gear shift device will be described in the following by way of a non-limiting example with reference to the appended drawings. In the drawings:

FIGS. 2, 4, and 5 are elevational sectional views taken along line A-A in FIG. 7 where the gear shift lever is illustrated in different pivotal positions;

FIGS. 3 and 6 show views rotated 90° relative to FIGS. 2, 4, and 5, and showing the bezel fitted on the upper housing, with the lever shown in different positions in different planes relative to each other and relative to FIGS. 2 and 3;

DETAILED DESCRIPTION OF EXAMPLES

Figure 1:
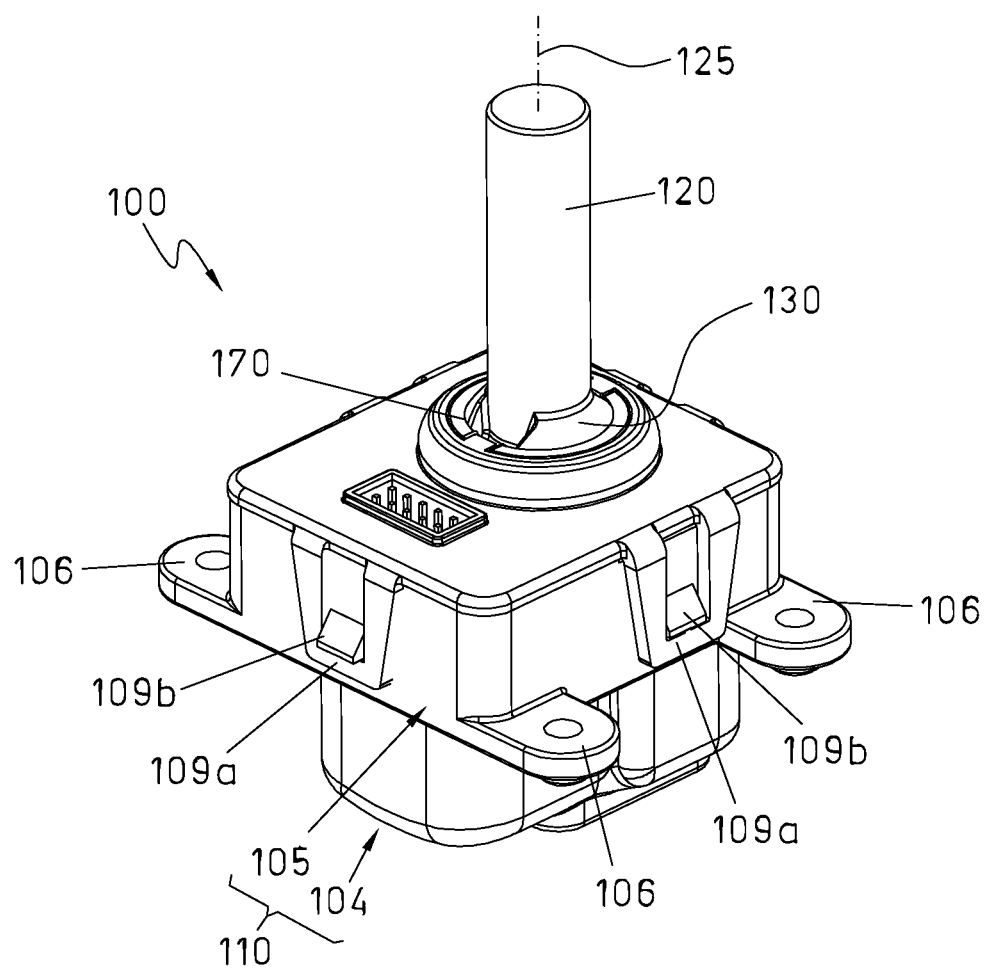
FIG. 1 is a general isometric perspective view of one example of the present gear shift device.
Figure 2:
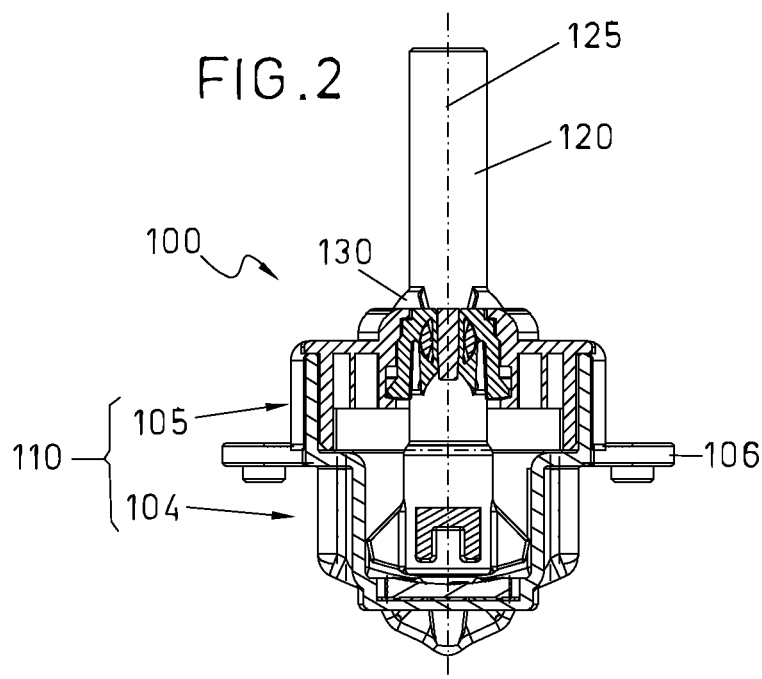
Figure 3:
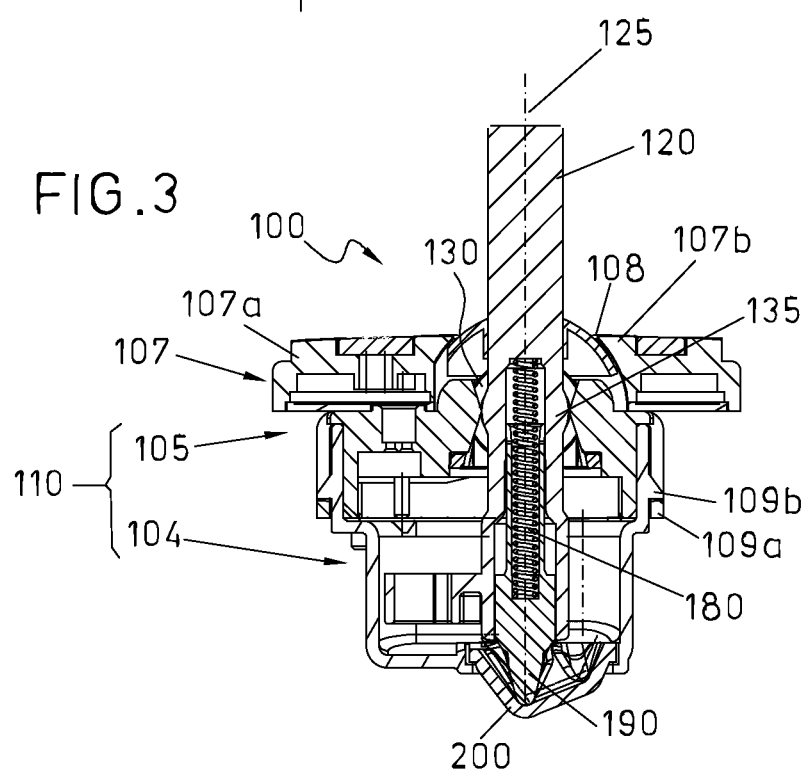
Figure 7:
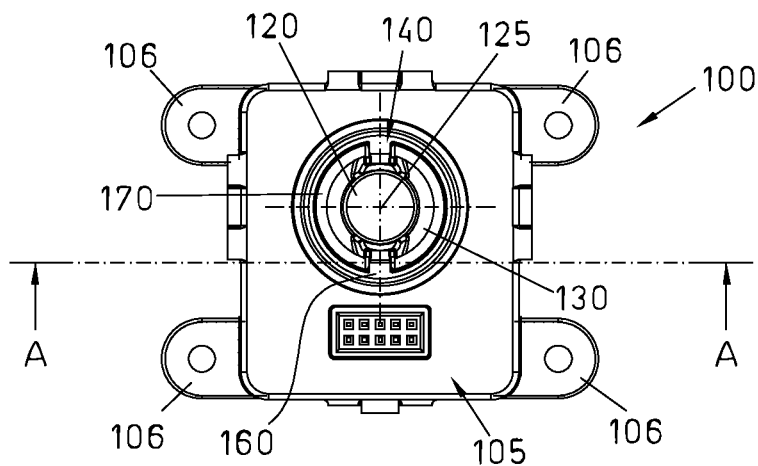
FIG. 7 is a top plan view of the gear shift device shown in FIGS. 1-6.

The gear shift device 100 that is shown in the example illustrated in the figures of the drawings includes a retaining housing 110 comprising a lower housing 104 and an upper housing 105. The lower housing 104 includes two opposite pairs of mounting portions 106 adapted for attaching the gear shift device 100 to a suitable fixed location of a motor vehicle, such as for example through the use of screws or the like. A bezel 107 is provided above the upper housing 105, as shown in FIGS. 3 and 6. The bezel 107 comprises a fixed portion 107a that is a cover surface having an opening 108, and a movable portion 107b that is adapted for concealing said opening 108, as shown in FIGS. 3 and 6. The upper housing 105 further includes upper housing attaching portions 109a adapted for coupling to corresponding lower housing attaching portions 109b formed in the lower housing 104.

A gear shift lever 120 is provided comprising a cylindrical portion as shown in FIG. 10 and FIG. 11 of the drawings. The gear shift lever 120 is partially received in the retaining housing 110 such that its cylindrical portion passes through the opening 108 of the bezel 107. The opening 108 of the bezel 107 is sized to allow the gear shift lever 120 to be pivoted in different directions as it is actuated by a user. The cylindrical portion of the gear shift lever 120 has an upper end that is adapted to receive a knob, not shown in the drawings.

The cylindrical portion of the gear shift lever 120 also has a lower end that is received inside the lower housing 104.

A spring 180 is provided in the gear shift device 100. As shown in FIGS. 3 and 6 of the drawings, the spring 180 is arranged in the gear shift lever 120 to urge a plunger 190 therein against a feeling surface 200 to provide a gear shift feeling to the user as the gear shift lever 120 is actuated.

The lever 120 has an at least partially spherical projection 130. In the example, the spherical projection 130 is a ball formed at one joint section of the gear shift lever 120 where it is pivoted to the retaining housing 110, as shown in detail in the drawings. The at least partially spherical projection 130 is received in slidable contact within the above mentioned retaining housing 110. The at least partially spherical projection 130 of the gear shift lever 120 serves the purpose of allowing the gear shift lever 120 to be pivoted relative to the lower and upper housings 104, 105, that is, relative to the retaining housing 110 as it is actuated by a user for driving a motor vehicle transmission.

In the example shown in the drawings, a socket member 170 is also provided. The socket member 170 is illustrated in detail in FIG. 8. In use, the socket member 170 is retained in the upper housing 105 of the retaining housing 110 by means of radially extending coupling flanges 172. The coupling flanges 172 are adapted to fit inside corresponding coupling recesses 172' that are formed in an inner surface of the upper housing 105, as shown in FIGS. 9a, 9b of the drawings.

Figure 8:
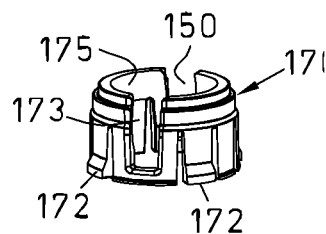
FIG. 8 is an isometric perspective view of one example of a socket member.
Figure 9A:
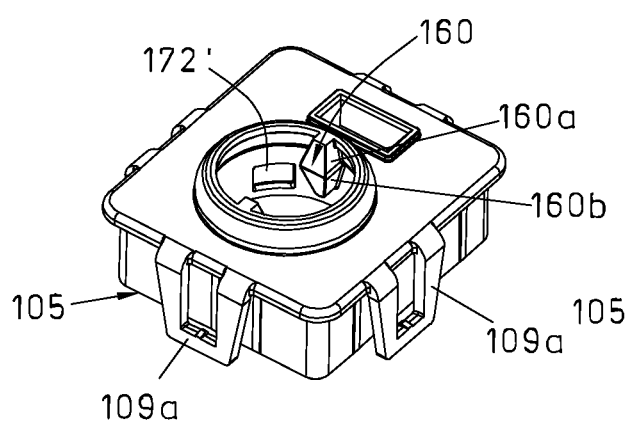
FIG. 9a is an isometric perspective view of one example of the upper housing of the retaining housing where the protrusions are formed in the shape of two opposite cones.
Figure 9B:
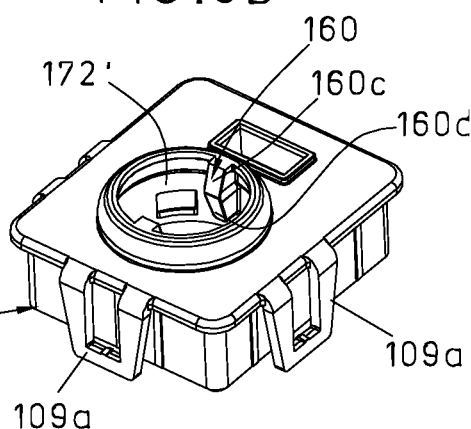
FIG. 9b is an isometric perspective view of a further example of the upper housing of the retaining housing where the protrusions are formed with two inclined front planes.

As illustrated in FIG. 8, the socket member 170 has an at least partially spherical inner receiving portion 175 adapted for receiving at least partially spherical projection 130 of the gear shift lever 120 in slidable contact therein. The at least partially spherical projection 130 of the gear shift lever 120 and the socket member 170 both define a ball and socket joint for the pivotal movement of the gear shift lever 120.

Referring again to FIG. 8, the socket member 170 has two symmetrical grooves 150 adapted to receive two corresponding symmetrical protrusions in the form of elongated ribs 160 formed in the upper housing 105 of the retaining housing 110. The ribs 160 have an elongated cross-section according to an axial direction, that is, along the longitudinal axis 125 of the gear shift lever 120. The elongated ribs 160 are formed in the same plane.

More specifically, the elongated ribs 160 are arranged projecting from the interior of the upper housing 105 of the retaining housing 110. The elongated ribs 160 are arranged so as to radially extend into grooves 150' formed in the at least partially spherical projection 130 of the gear shift lever 120. The elongated ribs 160 are also arranged so as to radially extend into the grooves 150 formed in the socket member 170.

The grooves 150 of the socket member 170 have substantially parallel walls 173 projecting inwardly to avoid friction of ribs 160 and grooves 150' since direct contact is avoided between the at least partially spherical projection 130 of the gear shift lever 120 and the upper housing 105. A cost effective suitable material may be thus used only for the socket member 170, thereby reducing costs.

In use, the elongated ribs 160 of the retaining housing 110 are received inside the symmetrical grooves 150 of the socket member 170 and, in turn, inside the above mentioned grooves 150' formed in the at least partially spherical projection 130 of the gear shift lever 120 as it can be seen in FIGS. 9a,b and 10a,b of the drawings.

As shown in FIGS. 3, 6 and 10a, 10b of the drawings, the grooves 150' of the at least partially spherical projections 130 include a curved protruding portion 135. In the example shown in said figures, the protruding portion 135 is spherical in shape but other geometries such as cylindrical may be used. The curved protruding portions 135 are intended to be contacted by a corresponding front surface or edge of the elongated ribs 160 as they move thereon.

Figure 10A:
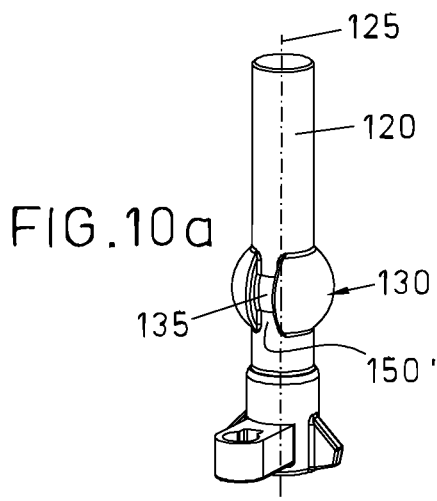
FIG. 10a is an isometric perspective view of a first example of the retaining means in the spherical projection of the gear shift lever.
Figure 10B:
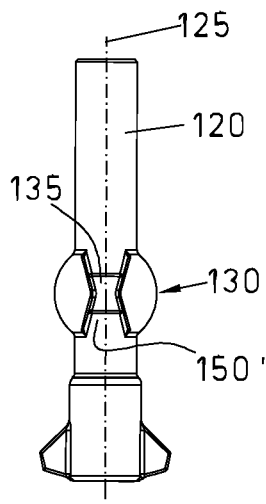
FIG. 10b is an isometric perspective view of a second example of the retaining means in the spherical projection of the gearshift lever.

FIGS. 9a and 9b show two different examples of the geometry of the ribs 160. In a first example shown in FIG. 9a, the ribs 160 are shaped in the form of two opposite cones, that is, with side walls each defined with inclined planes 160a, 160b. In said first example shown in FIG. 9a, the ribs 160 are configured to be received in grooves 150' formed in the at least partially spherical projection 130 of the shift lever 120, with said grooves 150' formed by at least substantially parallel side walls as shown in FIG. 10a. In a second example shown in FIG. 9b, the ribs 160 are shaped with flat side walls arranged substantially parallel to each other. In this specific example shown in FIG. 9b, the ribs 160 are configured to be received in corresponding grooves 150' formed in the at least partially spherical projection 130 of the shift lever 120, with said grooves 150' formed in the shape of two opposite cones as shown in FIG. 10b.

The grooves 150, 150' of the socket member 170 and those of the at least partially spherical projection 130 of the shift lever 120, together with the elongated ribs 160 of the retaining housing 110, all define retaining means 140. The retaining means 140 are best shown in FIGS. 2-10a,b of the drawings. The retaining means 140 are configured to retain the gear shift lever against rotation around a longitudinal axis 125 that is defined along the length of the gear shift lever 120 as shown in FIGS. 1-5.

For mounting the gear shift device 100, socket member 170 is first fitted in the gear shift lever 120 and then, the gear shift lever 120 is inserted in the upper housing 105. The assembly is then closed by the lower housing 104.

In general, at least one of the grooves 150, 150' and/or at least one of the protrusions or elongated ribs 160 may be provided with any suitable double opposite tapered configuration. In any case, in such geometrical configuration a longitudinal axis is defined, arranged at least substantially parallel to the longitudinal axis 125 of the gear shift lever 120, as shown in figures of the drawings.

It is important to note that the protrusions, i.e. the elongated ribs 160 formed in the shape of two opposite cones to be received into corresponding grooves 150' formed with parallel walls (example in FIGS. 9a, 10a) and the elongated ribs 160 formed with parallel walls to be received into corresponding grooves 150' formed in the shape of two opposite cones (example in FIGS. 9b, 10b) both share the feature that the elongated rib-groove interface is formed with two inclined planes or two inclined curved surfaces.

The example of the gear shift device 100 described has been found to be very robust and stiff, as well as compact in size, as a result of which the joint section of the gear shift lever 120 can be located very close to the bezel 107.

Although only a number of particular examples of the present gear shift device have been disclosed herein, it will be understood by those skilled in the art that other alternative examples and/or uses and obvious modifications and equivalents thereof are possible. For example, although retaining means have been disclosed as comprising grooves and protrusions each formed in the shape of two opposite cones, said grooves and protrusions might be configured in the shape of two opposite pyramids or any other polygonal geometry as long as a double opposite tapered configuration is defined.

The present disclosure is not limited to the particular examples described of the gear shift device, but also is intended to include any possible combinations that include the particular described examples. The scope of the present disclosure should not be limited by particular examples, but should be determined only by a fair reading of the claims that follow.

Reference signs related to drawings and placed in parentheses in a claim are solely for attempting to increase intelligibility and shall not be construed as limiting in scope.

What is claimed is:

1. A gear shift device for controlling a vehicle transmission, the gear shift device comprising:
   a hollow, at least partially spherical, retaining housing including a protrusion;
   a gear shift lever whose length defines a longitudinal axis, the gear shift lever having an at least partially spherical projection projecting radially outward with respect to the longitudinal axis and formed at one joint section of the gear shift lever to be at least partially received in slidable contact within the retaining housing, said at least partially spherical projection defining a gear shift lever groove opened radially outward; and
   a retaining means arranged to retain the gear shift lever against rotation about the longitudinal axis of the gear shift lever, the retaining means including the gear shift lever groove and the protrusion, wherein the gear shift lever groove is defined by two sidewalls carried by the at least partially spherical projection, the two sidewalls being opposed to one-another and are spaced circumferentially apart from one-another, and the protrusion carries two sidewalls facing in opposite circumferential directions with respect to the longitudinal axis, wherein the protrusion projects radially inward with respect to the longitudinal axis and into the groove such that contact of either of the two sidewalls carried by the protrusion with the circumferentially opposing sidewall carried by the at least partially spherical projection prevents rotation of the gear shift lever about the longitudinal axis, and
   wherein one of the two sidewalls of the at least partially spherical projection and the two sidewalls of the protrusion include a double opposite tapered configuration with each sidewall having two inclined planes that meet at an interface, and the other of the two sidewalls are parallel to one-another.

2. The device of claim 1, further comprising an at least partially spherical socket member to be retained in the retaining housing and adapted to at least partially receive the at least partially spherical projection of the gear shift lever in slidable contact therein.

3. The device of claim 2, wherein the joint section of the gear shift lever is located close to a bezel attached to the retaining housing.

4. The device of claim 3, wherein the bezel comprises a fixed portion having an opening, and a movable portion that is adapted for concealing said opening.

5. The device of claim 2, further comprising a spring arranged in the gear shift lever to urge a plunger against a feeling surface to provide a gear shift feeling to the user as the gear shift lever is actuated.

6. The device of claim 2, wherein the at least partially spherical socket member is configured such that the retaining housing and the at least partially spherical projection of the gear shift lever are not in direct contact in use.

7. The device of claim 2, wherein the socket member includes radially extending coupling flanges adapted to fit inside of corresponding coupling recesses formed in an inner surface of the retaining housing for retaining the socket member in the retaining housing.

8. The device of claim 1, wherein the protrusion is in the shape of two oppositely-tapered cones or two oppositely-tapered pyramids and the two sidewalls defining the groove are parallel to one-another.

9. The device of claim 1, wherein the retaining means includes a second groove configured diametrically opposite to the groove, and the retaining housing includes a second protrusion projecting radially inward and into the second groove.

10. The device of claim 1, wherein the protrusion has a cross-section elongated according to an axial direction along the longitudinal axis of the gear shift lever.

11. The device of claim 10, wherein the protrusion comprising the elongated cross-section is shaped to correspond to the two oppositely-tapered cones or two oppositely-tapered pyramids.

12. The device of claim 1, wherein the at least partially spherical projection includes a curved protruding portion disposed completely within the groove.

* * * * *